(12) United States Patent
Lin (10) Patent No.: US 11,527,058 B2
(45) Date of Patent: Dec. 13, 2022

(54) DATA GENERATING METHOD, AND COMPUTING DEVICE AND NON-TRANSITORY MEDIUM IMPLEMENTING SAME

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 273 days.

(21) Appl. No.: 16/883,886

(22) Filed: May 26, 2020

(65) Prior Publication Data

US 2021/0209420 A1 Jul. 8, 2021

(30) Foreign Application Priority Data

Jan. 8, 2020 (CN) .......................... 202010017967.6

(51) Int. Cl.
| | | |
|---|---|---|
| *G06V 10/778* | (2022.01) | |
| *G06K 9/62* | (2022.01) | |
| *G06F 17/18* | (2006.01) | |
| *G06N 20/00* | (2019.01) | |
| *G06F 7/24* | (2006.01) | |
| *G06V 10/764* | (2022.01) | |

(52) U.S. Cl.
CPC .............. *G06V 10/778* (2022.01); *G06F 7/24* (2013.01); *G06F 17/18* (2013.01); *G06K 9/6228* (2013.01); *G06K 9/6261* (2013.01); *G06K 9/6262* (2013.01); *G06N 20/00* (2019.01); *G06V 10/765* (2022.01)

(58) Field of Classification Search
CPC .............. G06V 10/771; G06V 10/776; G06V 30/19153; G06V 10/765; G06V 10/778; G06N 20/00; G06F 7/24
See application file for complete search history.

(56) References Cited

U.S. PATENT DOCUMENTS

| | | | |
|---|---|---|---|
| 10,720,151 B2 | 7/2020 | Sypniewski et al. | |
| 2018/0307741 A1* | 10/2018 | Kida | ...................... G06N 20/00 |
| 2019/0065989 A1* | 2/2019 | Kida | ................... G06N 3/0481 |
| 2019/0236333 A1* | 8/2019 | Hsiung | ................ G06V 20/698 |

(Continued)

FOREIGN PATENT DOCUMENTS

| | | |
|---|---|---|
| CN | 106951848 | 7/2017 |
| CN | 109214501 | 1/2019 |

(Continued)

OTHER PUBLICATIONS

Hu, et al. (Computer English Translation of Chinese Patent No. CN 109389142 A), pp. 1-10 (Year: 2019).*

*Primary Examiner* — Daniel G Mariam
(74) *Attorney, Agent, or Firm* — ScienBiziP, P.C.

(57) ABSTRACT

A data generating method includes obtaining first sample data, determining a type of the first sample data and a corresponding data expansion method, expanding the first sample data according to the determined data expansion method to generate second sample data, and dividing the first sample data and the second sample data into a training set and a verification set according to a preset rule. A data model is trained according to the training set, and the data model is verified according to the verification set after training.

14 Claims, 4 Drawing Sheets

(56) References Cited

U.S. PATENT DOCUMENTS

2019/0392351 A1* 12/2019 Zuluaga .............. G06F 11/3428
2020/0320371 A1   10/2020 Baker

FOREIGN PATENT DOCUMENTS

CN    110189288        8/2019
TW    201946185  A    12/2019
TW    202038135  A    10/2020

* cited by examiner

DATA GENERATING METHOD, AND COMPUTING DEVICE AND NON-TRANSITORY MEDIUM IMPLEMENTING SAME

FIELD

The subject matter herein generally relates to artificial intelligence, and more particularly to a data generating method for training and verifying a data model.

BACKGROUND

In the field of artificial intelligence, it is often necessary to train a data model to identify information, which may include images, text, and numbers. During a data model training process, a large amount of raw data needs to be obtained to train the data model, and the amount of raw data directly affects a fitting accuracy, parameter settings, and algorithm selection of the data model. However, in some technical fields, a sufficient amount of raw data cannot be obtained. Therefore, a method for generating data to train a model is desired.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
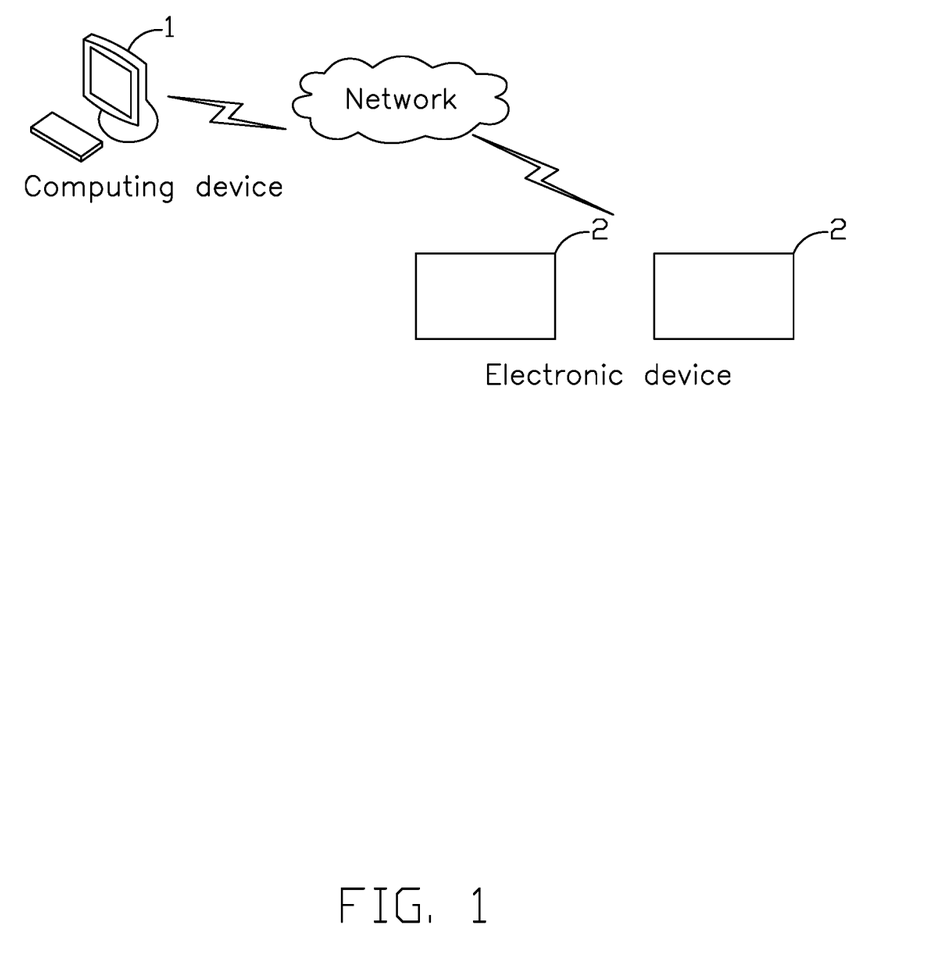
FIG. 1 is a schematic diagram of an embodiment of an application environment of a data generating method.

FIG. 1 shows a schematic diagram of an embodiment of an application environment of a data generating method.

The data generating method is applied in a computing device 1, and the computing device 1 establishes a communication connection with at least one electronic device 2 through a network. The electronic device 2 is configured to obtain first sample data and send the obtained first sample data to the computing device 1 through the network. The computing device 1 is configured to receive the first sample data, mark the first sample data as a training set, and generate second sample data from the first sample data according to the data generating method for use as a verification set. The network may be a wired network or a wireless network, such as radio, wireless fidelity (WIFI), cellular, satellite, and broadcast.

The computing device 1 may be an electronic device such as a personal computer, a server, and the like installed with data generation software. The server may be a single server, a server cluster, or a cloud server.

The electronic device 2 may be a portable electronic device with a camera function, a test device, or a production device for acquiring a sample image. The electronic device 2 may also be a production device or a test device with a production data recording function. The electronic device 2 may also be an electronic device with word processing and input functions, including, but is not limited to, a smart phone, a tablet computer, a laptop computer, a desktop computer, etc., for receiving sample data input by a user.

Figure 2:
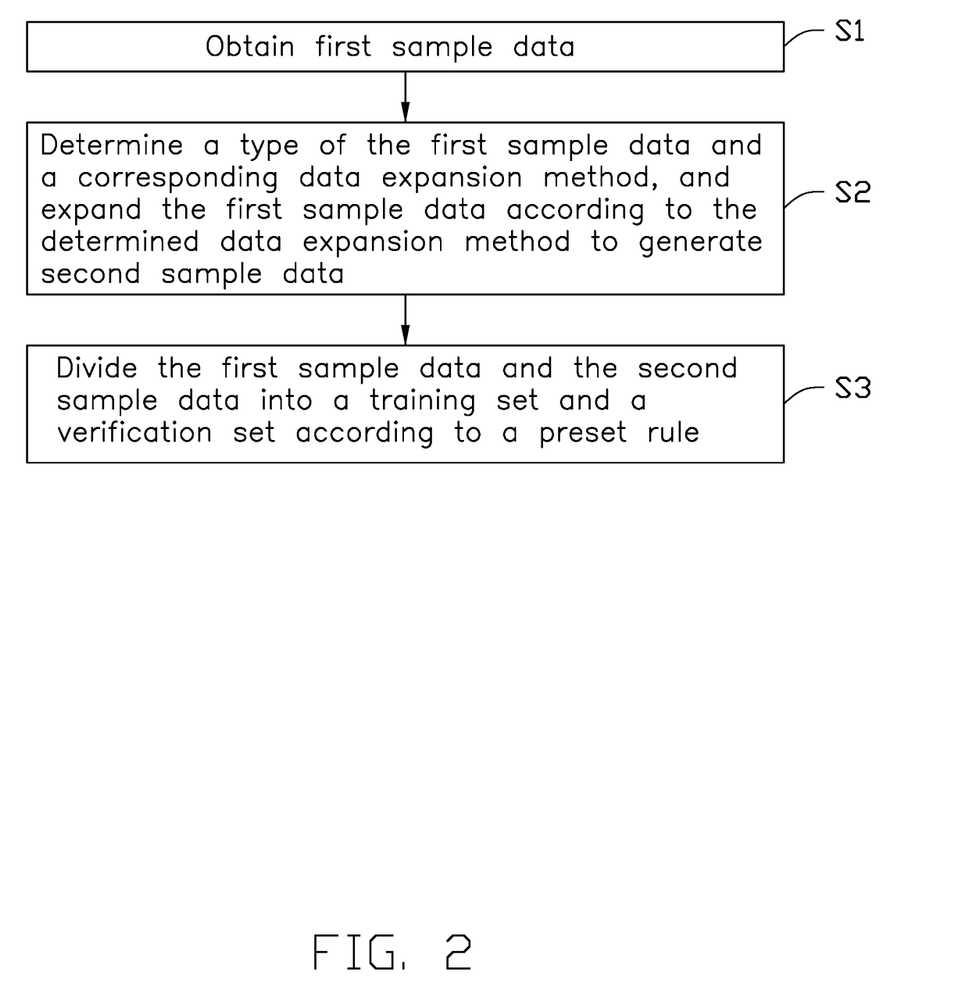
FIG. 2 is a flowchart of the data generating method.

FIG. 2 shows a flowchart of the data generating method. According to different requirements, the order of blocks in the flowchart can be changed, and some blocks can be omitted or combined.

Block S1: First sample data is obtained.

The first sample data may include at least one of an image, a number, and a text.

In one embodiment, the first sample data may be images of defective products obtained by the computing device 1 from the at least one electronic device 2. For example, when the at least one electronic device 2 detects a product that has a surface scratch flaw, an image of the product with the surface scratch flaw is obtained and sent to the computing device 1, which receives the image.

In one embodiment, the first sample data may include all images of external characteristics of the products obtained on the line by the at least one electronic device 2, and the at least one electronic device 2 sends the images to the computing device 1.

After receiving the images, the computing device 1 identifies feature information in the images, compares the feature information in the images to feature information in a preset database, and determines whether the feature information in the images meets a preset condition. If the feature information in the images meets the preset condition, the images having the feature information are marked as the first sample data. The feature information in the preset database may be feature information that meets a sample data condition, or may be feature information that does not meet the sample data condition. The sample data condition may be a product image that differs from a product appearance. The sample data condition may also be a product image that meets requirements of the product appearance.

Block S2: A type of the first sample data and a corresponding data expansion method are determined, and the first sample data is expanded according to the determined data expansion method to generate second sample data.

In one embodiment, when the type of the first sample data is an image type, the corresponding data expansion method includes repeatedly rotating each first sample image by a preset angle to generate a maximum number of second sample images according to the preset angle. For example, each of first sample images in a training set is repeatedly rotated by one degree in a clockwise direction to generate 359 second sample images. The 359 second sample images are marked as a verification set.

In another embodiment, when the type of the first sample data is the image type, the data expansion method further includes repeatedly reducing at least one preset ratio of the each first sample image to generate a preset number of second sample images according to the preset ratio. For example, each of a length and width of each pixel are reduced by 5% to generate a first second sample image having a 95% ratio, a second second sample image having a 90% ratio, a third second sample image having an 85% ratio, and so on until a total of ten second sample images are generated.

In another embodiment, when the type of the first sample data is the image type, the data expansion method further includes repeatedly magnifying at least one preset ratio of the each first sample image to generate a preset number of second sample images according to the preset ratio.

In another embodiment, when the type of the first sample data is a numerical type, the data expansion method includes grouping first sample numerals according to a preset rule, and taking an average value of each group to generate second sample numerals. For example, in order to study a color gamut conversion among different devices, it is often necessary to obtain a color value of an image to be tested displayed on the different devices. The color value is a number from 0 to 255. When building a color gamut conversion model, a preset number of color values is required to be input into the color gamut conversion model to train the color gamut conversion model, so that the color gamut conversion model can identify a color gamut conversion relationship among the different devices, so that the color value displayed on any device can be determined according to the color value displayed on another device. However, when the preset number of color values cannot be obtained, the color values that have already been obtained are grouped by grouping each three adjacent color values into one group, and the average values of the three color values of the same groups are used as the second sample data in the verification set to verify the color gamut conversion model.

In another embodiment, when the type of the first sample data is the numerical type, the data expansion method may further include grouping the first sample numerals according to a preset rule, and taking a standard deviation value of each group to generate the second sample numerals.

In another embodiment, when the type of the first sample data is a textual type, the data expansion method includes determining a part of speech and a technical field of first sample text, and searching for synonyms of the first sample text in the technical field to which the first sample text belongs to generate second sample text. For example, a file archiving model is constructed, so that files input into the file archiving model are correctly classified. In order to increase an accuracy of the file archiving model, a preset number of texts is required to train the file archiving model.

Because there are not many documents in some technical fields (such as in the military and archeology), the preset number of texts cannot be obtained. Synonyms of the first sample text are generated and used as the verification set. The file archiving model is trained according to the text in existing documents, and then the file archiving model is verified according to the verification set.

Block S3: The first sample data and the second sample data are divided into a training set and a verification set according to a preset rule. A data model is trained according to the training set, and the data model is verified according to the verification set after training.

A method for dividing the first sample data and the second sample data into the training set and the verification set according to the preset rule may include any one of the following:

Using the first sample data as the training set and using the second sample data as the verification set; and Integrating the first sample data and the second sample data into a sample data set, dividing the sample data set into two sample data sets according to a preset ratio, using a first one of the two sample data sets as the training set, and using a second one of the two sample data sets as the verification set.

In another embodiment, block S3 may further include:

Selecting a data model and using the training set to train the data model, and using the data model to obtain feature information in the training set;

Using the verification set to verify the trained data model, and determining an accuracy of the data model according to the feature information in the training set based on the verification results; and Determining whether the accuracy of the data model is greater than a preset threshold. If the accuracy is greater than the preset threshold, the data model is output. If the accuracy is not greater than the preset threshold, the data in the training set is resorted, and then the data model is retrained. A method of resorting the training set includes one or more of the following: removing data that does not have the feature information in the training set, and re-dividing the first sample data and the second sample data into the training set and the verification set.

Figure 3:
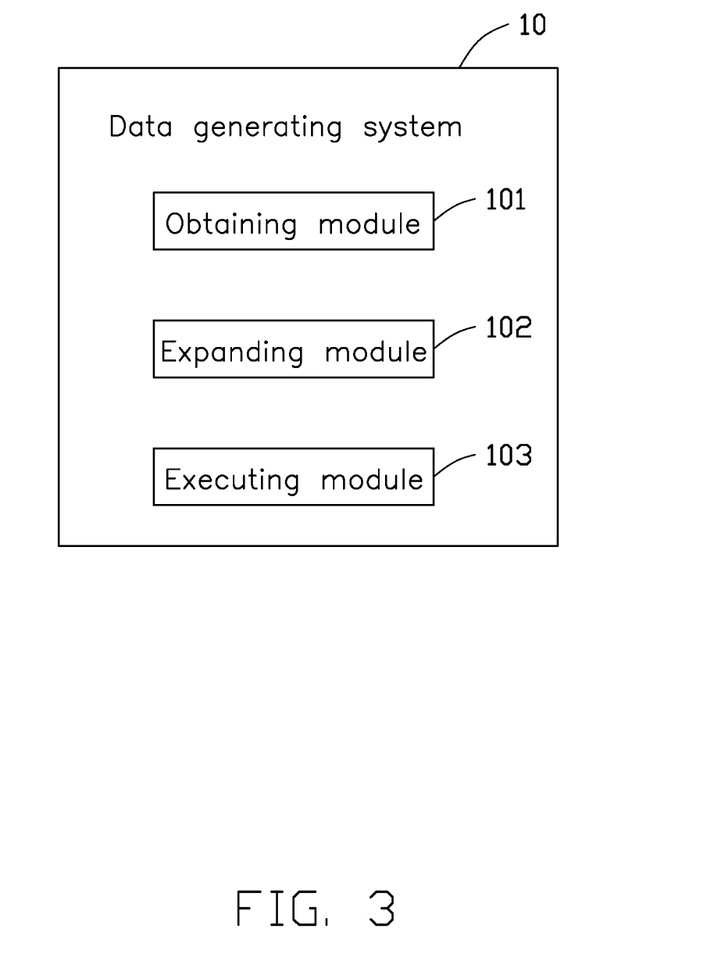
FIG. 3 is a block diagram of function modules of a data generating system.

FIG. 3 is a block diagram of an embodiment of function modules of a data generating system 10.

In one embodiment, the data generating system 10 runs in a computing device, such as the computing device 1. The computing device is in communication connection with an electronic device via a network. The data generating system 10 may include a plurality of function modules composed of program code segments. Program codes of each program code segment may be stored in a memory of the computing device and executed by at least one processor to implement functions of the data generating system 10. In one embodiment, the data generating system 10 may be divided into a plurality of function modules according to functions performed by the data generating system 10. The function modules may include an obtaining module 101, an expanding module 102, and an executing module 103.

The obtaining module 101 is configured to obtain the first sample data. Functions of the obtaining module 101 are described in block S1, and will not be discussed further.

The expanding module 102 is configured to determine the type of the first sample data and the corresponding data expansion method, and expand the first sample data according to the determined data expansion method to generate the second sample data. Functions of the expanding module 102 are described in block S2, and will not be discussed further.

The executing module 103 is configured to divide the first sample data and the second sample data into the training set and the verification set according to the preset rule. The data model is trained according to the training set, and the data model is verified according to the verification set after training. Functions of the executing module 103 are described in block S3, and will not be discussed further.

Figure 4:
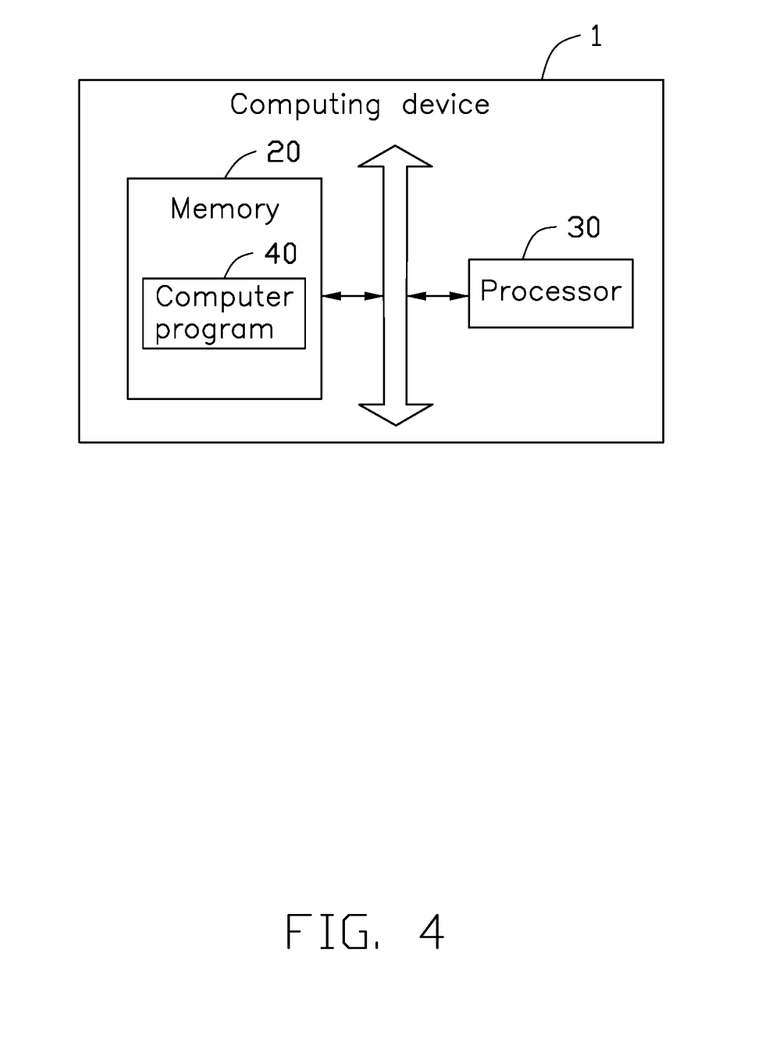
FIG. 4 is a schematic diagram of a computing device.

FIG. 4 is a schematic diagram of the computing device 1. The computing device 1 includes a memory 20, a processor 30, and a computer program 40. The computer program 40 is stored in the memory 20 and executable by the processor 30. When the processor 30 executes the computer program 40, the blocks S1-S3 in the data generating method may be implemented. Alternatively, when the processor 30 executes the computer program 40, the functions of the function modules 101-103 in the data generating system 10 may be implemented.

Those skilled in the art should understand that the schematic diagram of the computing device 1 does not constitute a limitation of the computing device 1. The computing device 1 may include more or fewer components than shown, or may combine some components. For example, the computing device 1 may further include an input-output device, a network access device, a bus, and the like.

The processor 30 may be a central processing unit (CPU), or may be other general-purpose processors, digital signal processors (DSPs), application specific integrated circuits (ASICs), a Field-Programmable Gate Array, (FPGA) or other programmable logic devices, discrete gate or transistor logic devices, discrete hardware components, etc. The general-purpose processor may be a microprocessor, or the processor 30 may be any conventional processor, etc. The processor 30 is a control center of the computing device 1 and uses various interfaces and lines to connect various parts of the computing device 1.

The memory 20 may be configured to store the computer program 40, and the processor 30 may execute or execute the computer program 40. The data in the memory 20 may realize various functions of the computing device 1. The memory 20 may mainly include a storage program area and a storage data area, wherein the storage program area may store an operating system, at least one application required by a function (such as a sound playback function, an image playback function, etc.). The storage data area may store data (such as audio data) and the like created according to the use of the computing device 1. In addition, the memory 20 may include a high-speed random access memory, and may also include a non-volatile memory, such as a hard disk, an internal memory, a plug-in hard disk, a smart media card (SMC), a secure digital (SD) card, flash card, at least one disk storage device, flash memory device, or other non-volatile solid-state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data generating method comprising:
   obtaining first sample data;
   determining a type of the first sample data and a corresponding data expansion method, and expanding the first sample data according to the determined data expansion method to generate second sample data, wherein the type of the first sample data is at least one of: an image type; a numerical type; and a textual type;
   when the type of the first sample data is the textual type, a method of expanding the first sample data to generate the second sample data comprises: determining a part of speech and a technical field of a text of first sample data, and searching for synonyms of the first sample data in the technical field to which the first sample data belongs to generate second sample data;
   dividing the first sample data and the second sample data into a training set and a verification set according to a preset rule;
   training a data model according to the training set; and
   verifying the data model according to the verification set.

2. The data generating method of claim 1, wherein a method for dividing the first sample data and the second sample data into the training set and the verification set according to the preset rule comprises one of:
   using the first sample data as the training set and using the second sample data as the verification set; and
   integrating the first sample data and the second sample data into a sample data set, dividing the sample data set into two sample data sets according to a preset ratio, using a first one of the two sample data sets as the training set, and using a second one of the two sample data sets as the verification set.

3. The data generating method of claim 1, further comprising:
   selecting the data model and using the training set to train the data model, and using the data model to obtain feature information in the training set; and
   using the verification set to verify the trained data model, and determining an accuracy of the data model according to the feature information in the training set based on the verification results.

4. The data generating method of claim 3, further comprising:
   determining whether the accuracy of the data model is greater than a preset threshold;
   if the accuracy is greater than the preset threshold, outputting the data model; and
   if the accuracy is not greater than the preset threshold, resorting the data in the training set, and then retraining the data model; wherein:
   a method of resorting the training set comprises at least one of: removing data that does not have the feature information in the training set, and re-dividing the first sample data and the second sample data into the training set and the verification set.

5. The data generating method of claim 1, wherein when the type of the first sample data is the image type, a method of expanding the first sample data to generate the second sample data comprises at least one of:
   repeatedly rotating each image of first sample images by a preset angle to generate a maximum number of second sample images according to the preset angle;
   repeatedly reducing at least one preset ratio of each first sample image to generate a preset number of second sample images according to the preset ratio; and
   repeatedly magnifying at least one preset ratio of each first sample image to generate a preset number of second sample images according to the preset ratio.

6. The data generating method of claim 1, wherein when the type of the first sample data is the numerical type, a method of expanding the first sample data to generate the second sample data comprises at least one of:
grouping numerals of first sample numerals according to a preset rule, and taking an average value of each group to generate second sample numerals; and
grouping the numerals of the first sample numerals according to a preset rule, and taking a standard deviation value of each group to generate the second sample numerals.

7. A computing device comprising:
a processor; and
a memory storing a plurality of instructions, which when executed by the processor, cause the processor to:
obtain first sample data;
determine a type of the first sample data and a corresponding data expansion method, and expand the first sample data according to the determined data expansion method to generate second sample data;
divide the first sample data and the second sample data into a training set and a verification set according to a preset rule;
select a data model and train the data model according to the training set, and obtain feature information in the training set according to the data model; and
verify the trained data model according to the verification set, and determine an accuracy of the data model according to the feature information in the training set based on the verification results;
determine whether the accuracy of the data model is greater than a preset threshold;
if the accuracy is greater than the preset threshold, output the data model; and
if the accuracy is not greater than the preset threshold, resort the data in the training set, and then retrain the data model; wherein:
the processor resorts the training set by at least one of:
removing data that does not have the feature information in the training set, and re-dividing the first sample data and the second sample data into the training set and the verification set.

8. The computing device of claim 7, wherein the processor divides the first sample data and the second sample data into the training set and the verification set according to the preset rule by one of:
using the first sample data as the training set and using the second sample data as the verification set; and
integrating the first sample data and the second sample data into a sample data set, dividing the sample data set into two sample data sets according to a preset ratio, using a first one of the two sample data sets as the training set, and using a second one of the two sample data sets as the verification set.

9. The computing device of claim 7, wherein when the type of the first sample data is an image type, the processor expands the first sample data to generate the second sample data by at least one of:
repeatedly rotating each image of first sample images by a preset angle to generate a maximum number of second sample images according to the preset angle;
repeatedly reducing at least one preset ratio of each first sample image to generate a preset number of second sample images according to the preset ratio; and
repeatedly magnifying at least one preset ratio of each first sample image to generate a preset number of second sample images according to the preset ratio.

10. The computing device of claim 7, wherein when the type of the first sample data is a numerical type, the processor expands the first sample data to generate the second sample data by at least one of:
grouping numerals of first sample numerals according to a preset rule, and taking an average value of each group to generate second sample numerals; and
grouping the numerals of the first sample numerals according to a preset rule, and taking a standard deviation value of each group to generate the second sample numerals.

11. The computing device of claim 7, wherein when the type of the first sample data is a textual type, the processor expands the first sample data to generate the second sample data by:
determining a part of speech and a technical field of a text of first sample data, and searching for synonyms of the first sample data in the technical field to which the first sample data belongs to generate second sample data.

12. A non-transitory storage medium having stored thereon instructions that, when executed by a processor of a computing device, causes the processor to perform a data generating method, wherein the method comprises:
obtaining first sample data;
determining a type of the first sample data and a corresponding data expansion method, and expanding the first sample data according to the determined data expansion method to generate second sample data, wherein when the type of the first sample data is a textual type, a method of expanding the first sample data to generate the second sample data comprises determining a part of speech and a technical field of a text of first sample data, and searching for synonyms of the first sample data in the technical field to which the first sample data belongs to generate second sample data;
dividing the first sample data and the second sample data into a training set and a verification set according to a preset rule;
selecting the data model and using the training set to train the data model, and using the data model to obtain feature information in the training set; and
using the verification set to verify the trained data model, and determining an accuracy of the data model according to the feature information in the training set based on the verification results.

13. The non-transitory storage medium of claim 12, wherein when the type of the first sample data is an image type, a method of expanding the first sample data to generate the second sample data comprises at least one of:
repeatedly rotating each image of first sample images by a preset angle to generate a maximum number of second sample images according to the preset angle;
repeatedly reducing at least one preset ratio of each first sample image to generate a preset number of second sample images according to the preset ratio; and
repeatedly magnifying at least one preset ratio of each first sample image to generate a preset number of second sample images according to the preset ratio.

14. The non-transitory storage medium of claim 12, wherein when the type of the first sample data is a numerical type, a method of expanding the first sample data to generate the second sample data comprises at least one of:
grouping numerals of first sample numerals according to a preset rule, and taking an average value of each group to generate second sample numerals; and grouping the numerals of the first sample numerals according to a preset rule, and taking a standard deviation value of each group to generate the second sample numerals.

* * * * *